United States Patent
Fisher

[19]

[11] Patent Number: 5,954,387
[45] Date of Patent: Sep. 21, 1999

[54] FUEL ACCESS DOOR WITH AFFIXED SEAL

[75] Inventor: Christopher M. Fisher, 13444 Verona, Tustin, Calif. 92782

[73] Assignee: Christopher M. Fisher, Tustin, Calif.

[21] Appl. No.: 09/031,336

[22] Filed: Feb. 26, 1998

[51] Int. Cl.[6] .................................................. B60K 15/05
[52] U.S. Cl. .............. 296/97.22; 220/86.2; 220/DIG. 33
[58] Field of Search ......................... 296/97.22; 220/86.2, 220/DIG. 33; 280/834

[56] References Cited

U.S. PATENT DOCUMENTS

| | | | |
|---|---|---|---|
| 2,035,895 | 3/1936 | Kelly ........................................... | 180/82 |
| 2,314,710 | 3/1943 | Keller ................................ | 296/97.22 X |
| 3,374,007 | 3/1968 | Ingolia ............................. | 296/97.22 X |
| 4,320,853 | 3/1982 | Moore ...................................... | 220/375 |
| 4,746,089 | 5/1988 | Clapper ................................. | 248/309.4 |
| 4,776,486 | 10/1988 | Mizusawa ............................... | 220/375 |
| 4,867,337 | 9/1989 | Eichenseer ............................. | 220/375 |
| 5,066,062 | 11/1991 | Sekulovski ........................... | 296/97.22 |
| 5,118,019 | 6/1992 | Harrison .......................... | 224/42.46 R |
| 5,253,920 | 10/1993 | Eldridge ............................... | 296/97.22 |
| 5,533,766 | 7/1996 | Färber ...................................... | 292/144 |
| 5,580,019 | 12/1996 | Glesser .................................. | 248/309.1 |
| 5,658,036 | 8/1997 | Benoist .................................. | 296/97.22 |
| 5,664,811 | 9/1997 | Martus et al. ..................... | 296/97.22 X |

*Primary Examiner*—Joseph D. Pape

[57] ABSTRACT

A permanent closure for fuel tanks mounted to an access door (28) with a hinge (30) connected to a vehicle, having an extended housing (22) which contains a rubber gasket (14) on the interior base, a spring (16) and a slideable internal fuel cap (24) Which meets EPA specifications. When the hinged access door (28) is in a closed position, a filler tube (20) on the vehicle enters a hole (10) in the extended housing (22) which meets the internal fuel cap (24) and an o-ring (12). A seal is obtained by closing the hinged access door (28) which presses the internal fuel cap (24) and the o-ring (12) against the filler tube (20), and into the rubber gasket (14) at the interior base of the extended housing (22). A locking pin (26), contacting a notch in the extended housing (22), insures the access door (28) remains closed, thus providing a continuous seal, and when released by a latch in the passenger compartment, maintains a seal, yet the spring partially urges the hinged access door (28) open. Vent holes (18) provide proper ventilation. The access door (28) is then easily opened exposing the filler tube (20) for refueling.

5 Claims, 1 Drawing Sheet

FUEL ACCESS DOOR WITH AFFIXED SEAL

BACKGROUND—FIELD OF INVENTION

This invention relates to automotive fuel caps, specifically to an improved design for creating a sealed fuel closure on fuel tanks.

BACKGROUND—DESCRIPTION OF PRIOR ART

Automobile manufacturers provide gas caps that are threaded. Such gas caps have been used for years, and have called for the requirement of after market gas caps to fulfill the need for misplaced gas caps.

Common automotive gas caps require threads to obtain a suitable seal. Threaded gas caps require a manual twisting motion, and the need to make the cap a separate entity from the fuel access door and the filler tube. For this reason, gas caps are set down somewhere, and subsequently lost. Also, by handling the gas cap, motorists are commonly left with a telltale gasoline odor on their hands and clothing. Several patents have been issued to motorized fuel tank locks, but none have been manufactured as yet, because of complexity.

Inventors have created several different ways to attach gas caps to the filler tube and automobile itself U.S. Pat. NO. 4,776,486 to Mizusawa (1988), 4,867,337 to Eichenseer (1989), and 4,320,853 to Moore (1982) respectively, all utilize a chain, string, or tether to connect the gas cap to the vehicle to prevent loss. This method is suitable, but the cap itself tends to bounce off the side of the vehicle, or the connector is not durable or proves cumbersome. Each of these methods still necessitate the need to manually "screw" the cap on and off.

Other inventors have found a way to eliminate the connector and hang or place the gas cap in an access door. U.S. Pat. No. 4,746,089 to Clapper (1988) employs the use of a magnet in the cap and in the access door, so when the cap is removed for refueling, it is placed on the magnet inside the access door. U.S. Pat. No. 5,118,019 to Harrison (1992) Has a flexible plastic receptacle adhered to the access door which can hold the gas cap while refueling. Although both may be affective, automobile manufacturers have chosen to eschew these designs in favor of the retrofitable gas cap holder commonly used in todays vehicles.

U.S. Pat. No. 5,580,019 to Glesser (1996) allows the motorist to place the cap in a retrofitted holder in the access door while refueling. Still, one is forced to manually "screw" the gas cap on and off. Also, if the gas cap is not placed properly on the holder, it falls to the ground more often than not under the vehicle in an oil puddle further mussing up the motorist's daily commute. Furthermore, because the retrofitable holder is the same color as the automobile, many automobile owners either don't know what the mechanism is or don't see it, or simply put the gas cap elsewhere and lose it.

Two clever designs are U.S. Pat. No. 5,066,062 to Sekulovski (1 991) and U.S. Pat. No. 5,533,766 to Farber. Sekulovski and Farber have suggested electrically operated remote control fuel closures operated by the motorist from inside the passenger compartment. Unfortunately, these are too expensive to manufacture and prove difficult if not impossible to refuel if a short is present in the circuitry of the automobile. Also, it is doubtful that these designs would stand up to EPA and crash testing.

U.S. Pat. No. 5,253,920 to Eldridge (1993) describes a hinged gas cap attached to the fender of a vehicle. An excellent design for farm or construction equipment, but poor esthetically for todays sleek, aerodynamic automobiles. Also, the design still calls for a "screwing" motion.

Finally, U.S. Pat. No. 5,658,036 to Benoist (1997) has a cap attached to the access door. The access door is operated vertically instead of horizontally, and the cap is mounted with bulky bolts and hinges. This design appears to require maintenance and it may not achieve a proper seal.

Although each of the aforementioned inventions solve basic problems and are not to be excluded in their merit, all the gas cap apparatus heretofore suffer from a number of disadvantages:

(a) Several of the designs require a "screwing" motion on and off which means that ultimately the motorist will get fuel on their hands and clothes.

(b) Screw-on gas caps are stolen or tampered with.

(c) Many of these inventions pose a threat of damaging the vehicle's look, or esthetic.

(d) Motorists often bang or skin their hands and fingers while removing and replacing rough edge, knurled gas caps.

(e) Motorized gas caps are too complicated.

(f) Manufacturers shy from motorized caps and access doors because of high cost and poor safety.

OBJECTS AND ADVANTAGES

Listed as follows are the objects and advantages of my present design and invention:

(a) to provide a fuel closure that the motorist will not have to "screw" on;

(b) to provide a fuel closure that incorporated s the hinged access door to manipulate the opening and closing of the gas cap;

(c) to provide a fuel closure that insures the motorist will not be forced to touch the gas cap, only the access door;

(d) to provide a fuel closure that is ergonomic and modern in design, which still obtains a proper seal;

(e) to provide a fuel closure that will not become misplaced, thus virtually eliminating after market gas caps;

(f) to provide a fuel closure that is simple and will stand up to stringent EPA and automotive crash testing requirements;

(g) to provide a fuel closure that motorists will forget about and not notice;

(h) to provide a fuel closure that may become the industry standard on automobiles.

Further objects and advantages are to provide a fuel closure that can be easily opened and closed by the vehicle owner, without damaging one's clothing or flesh, which would be ideal for handicapped or physically impaired motorists who have difficulty with standard gas caps, which is simple and inexpensive to manufactured, which complies with federal regulations, which can be manufactured in any color, and several ergonomic shapes, which can be used on any automobile, which will prove to be extremely durable, and which obviates the need to ever "screw" a gas cap again. Further objects and advantages will become apparent from a consideration of the following description and drawings.

SUMMARY

In accordance with the present invention a fuel closure comprises a fitted cap having an o-ring to achieve a seal with a filler neck within an extended housing with an internal spring and a rubber gasket mounted to an access door connected to the vehicle body with a hinge and locking pin that establishes contact with extended housing to seal, and a release lever in the passenger compartment, to open the unit.

REFERENCE NUMERALS IN DRAWINGS

| 10 | hole | 20 | filler tube |
|----|------|----|-------------|
| 12 | o-ring | 22 | extended housing |
| 14 | rubber gasket | 24 | internal fuel cap |
| 16 | spring | 26 | locking pin |
| 18 | vent hole | 28 | access door |
|    |      | 30 | hinge |

DETAILED DESCRIPTION OF INVENTION

Figure 2:
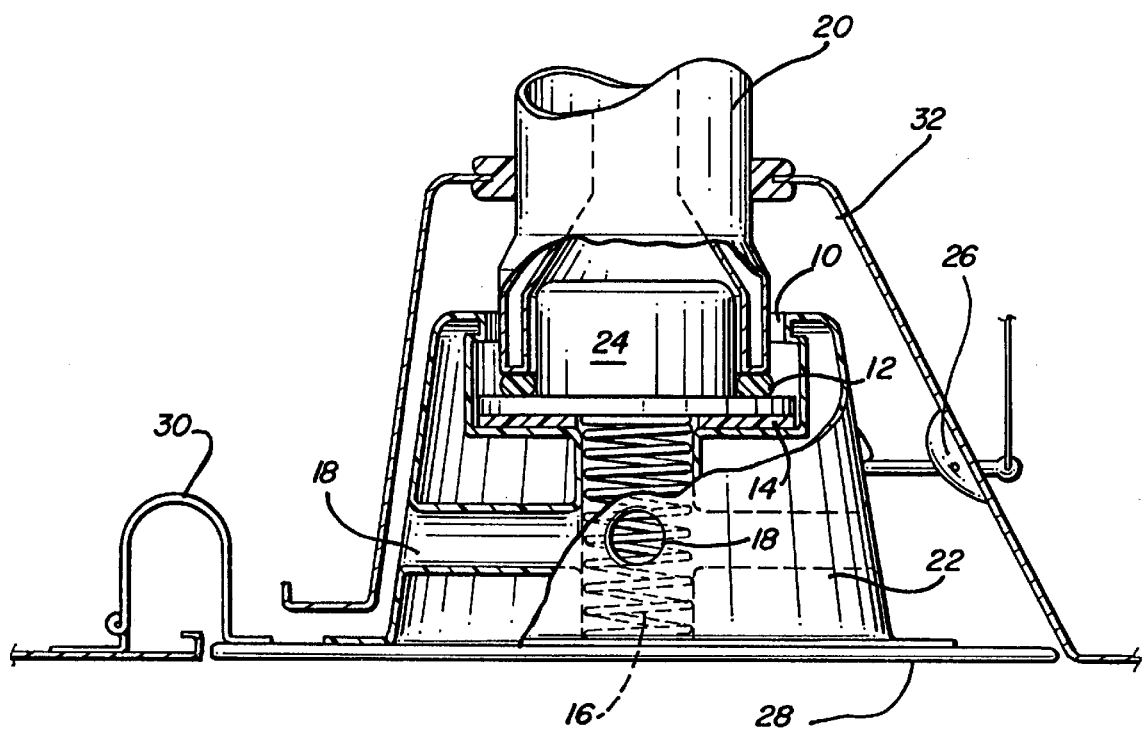
FIG. 2 shows a cross section view of the fuel access door with affixed seal in the closed position.

A typical embodiment of the fuel access door with affixed seal of present invention is illustrated in FIG. 2 (cross section). The access door 28 is made of a thin piece of metal or plastic which conforms to the vehicle body. The access door is connected to the vehicle body or fender by a hinge 30. The extended housing 22, made of a durable plastic or nylon, or any other suitable material, has venting holes 18, and a hole 10 at one end and is mounted to the access door with a series of fasteners, rivets, or clips or any other means that will obtain a permanent position. The interior of the extended housing 22 contains a spring 16, for movability of the internal fuel cap 24, in conjunction with a filler tube 20 and a rubber gasket 14 which provides a seal between the cap and filler tube 20. A locking pin 26, which contacts the extended housing, is released by a lever in the interior of the vehicle, thus allowing the spring to force open the access door 28 and allowing the motorist to refuel. When the access door 28 is closed, the locking pin contacts a notch in the extended housing 22, and insures the unit to be sealed.

From the description above, a number of advantages of my fuel access door with affixed seal become evident:

(a) by utilizing the fuel access door already standard on most vehicles, the gas cap is now eliminated from sight and mind, (b) the fuel access door with affixed seal would not be costly to manufacture, and its ease of use would far outweigh any hesitation of production, (c) it is the obvious step into the future of fuel closures.

Figure 1:
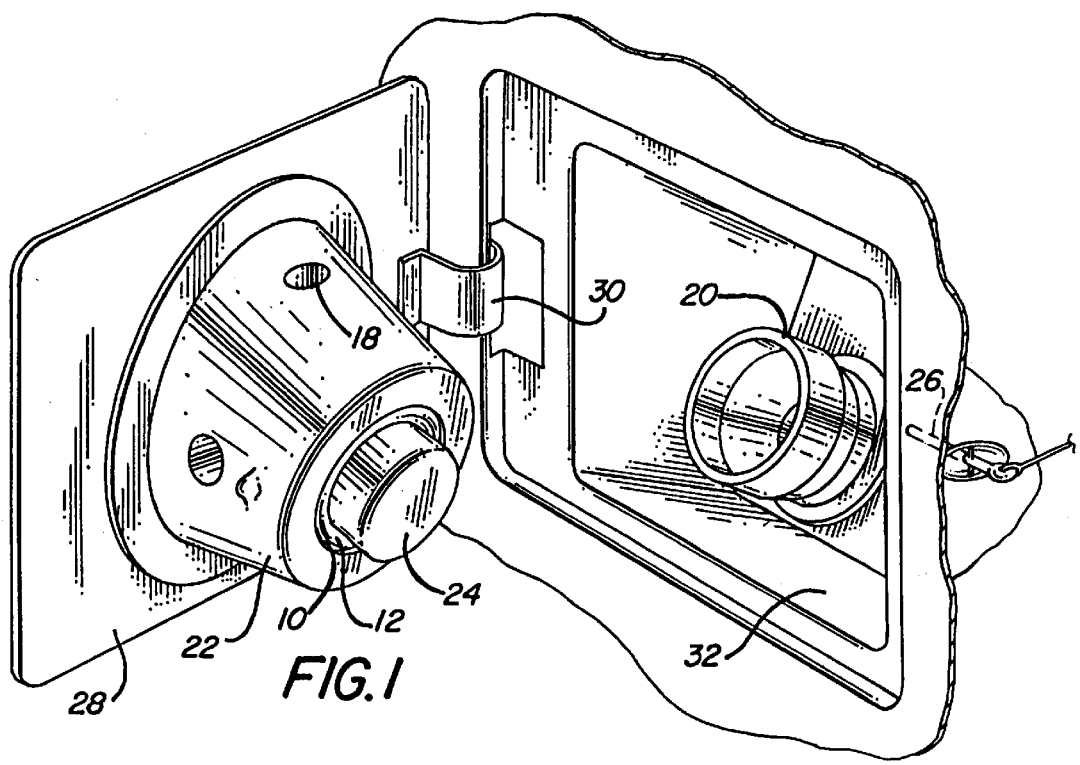
FIG. 1 shows a perspective view of the fuel access door with affixed seal in the open position mounted on a vehicle.

FIG. 1 illustrates the operation of use for the fuel access door with affixed seal which begins by the motorist releasing a latch in the passenger compartment, which is attached to a length of cable extending through the vehicle, to the interior portion of the rear fender. At the rear fender, the cable connects to a locking pin 26 mounted in a depression 32 which the filler tube protrudes, which when the latch in the passenger compartment is released, is retracted inward. At the moment the locking pin retracts, it breaks contact with a notch in the extended housing 22, and the access door 28 which fits over the depression 32 from which the filler tube protrudes, is released and opens partially. The access door is movable in relationship to the vehicle by the means of a hinge 30 joining the access door 28, and the vehicle fender. When the access door is partially open, the motorist is free to pull the access door open and away ninety degrees as it rotates on the hinge 30, thus allowing the motorist to expose the filler tube 20 and refuel. At the completion of refueling, the motorist may simply push the access door 28 into a closed position until it locks, and continue their commute. FIG. 1 shows the access door in a locked position, the locking pin 26 comes in direct contact with a notch in the extended housing 22 which is permanently mounted angularly, or perpendicular to align with the filler tube, to the access door. The extended housing 22 is made of a plastic or another synthetic material. It has a plurality of vent holes 18 and a hollow center with two connecting chambers, one large with a lipped hole in the top, and one smaller at the base. The base of the extended housing is permanently mounted to the access door 28, and through the center, has a narrow, hollow chamber which contains a spring 16 which urges the access door open when the locking pin 26 is released. The spring 16 extends from the base of the extended housing 22 to the base of the larger chamber of the extended housing which contains the internal fuel cap 24 which is slideable by means of the spring, and not able to exit the extended housing's chamber because of the retaining lip at the end of the hole 10. The internal fuel cap 24 is a standard gas cap by design, but without threads or a raised, turnable lid, and is flat on the bottom. The internal fuel cap contains an O-ring 14 to permit a seal between itself and the filler tube 20 when the access door 28 is in a close position and the filler tube is seated in a hole 10 of the access door against the internal fuel cap 24. In the interior base of the extended housing 22, the larger chamber which contains the internal fuel cap 24 has a circular rubber gasket 14 to fill any voids between the internal fuel cap and the extended housing's 22 interior base when the access door 28 is in a closed position. To permit a proper seal the internal fuel cap and the O-ring 14 form a seal with the filler tube 20. When the access door 28 is in a closed position, all parts included act integrally to lock together and form a seal: the hinge 30 rotates closed until the access door 28 is flush with the vehicle fender, the extended housing 22 contacts the locking pin 26 for which it has a notch to lock shut, the spring 16 retracts as the internal fuel cap 24 is forced into the rubber gasket 14 at the interior base and against the filler tube 20 for which the O-ring 12 creates a seal, while the vent holes 18 bleed off any fumes.

CONCLUSIONS, RAMIFICATIONS, AND SCOPE

Accordingly, the reader will conclude that the fuel access door with affixed seal can be used to seal an automobile fuel filler neck easily and conveniently, can be easily opened without harming or contaminating the user, and requires no "screwing". In addition, with few working parts, the apparatus would be quite easy to replace in part or whole inexpensively. Furthermore, the fuel closure has the additional advantages to follow:

it permits a proper seal to be achieved without "screwing" the cap;

it allows the user to simply open and close the vehicle access door to operate the gas cap, instead of having to open and close the door, and handle the cap, and find a proper place to put it;

it provides impossibility of loss or tampering;

it provides an easy, modern alternative to the environmentally safe fuel closure;

it provides simplicity and design that virtually all manufacturers could conform to for little or no more than current costs, and production could be imminent;

it provides a sealing device that is not even visible.

Although the above description contains many specifics, these should not be considered as limiting the scope of the invention but merely providing a working knowledge of the presently preferred embodiments of this invention. For example, the extended housing could be any shape and at any angle that would permit the cap and filler neck to meet, the spring for advancing and retracting the cap could be placed anywhere or replaced by hydraulics, or whatever the market calls for at that time. The access door could have an internal spring which would completely bleed any negative pressure and pop the door open, thus relieving the user of handling anything until the door needed closing, etc.

Thus the scope of the invention should be determined by the appended claims and their legal equivalents rather than the examples given.

I claim:

1. A fuel closure apparatus for sealing a fuel tank filler tube of a vehicle comprising:

an extended housing mounted to an access door including hinge means for mounting the access door on the vehicle for movement between an open position and a closed position;

a cap with sealing means surrounded by the extended housing;

spring means for biasing the cap outward from the extended housing; and locking means for maintaining the access door in a closed position, wherein the sealing means of the cap is engageable with the filler tube to provide a continuous seal therebetween.

2. The fuel closure apparatus of claim 1 wherein the extended housing is hollow and has venting means comprising vent holes.

3. The fuel closure apparatus of claim 1 wherein the sealing means comprises an O-ring.

4. The fuel closure apparatus of claim 1 wherein the locking means comprises a notch on the extended housing for releasable contact with a spring loaded pin.

5. The fuel closure apparatus of claim 1 wherein when the locking means is released, the spring means urges the access door partially open while still maintaining a seal between the filler tube and the cap.

* * * * *